US011767894B2

(12) United States Patent
Gilardoni et al.

(10) Patent No.: US 11,767,894 B2
(45) Date of Patent: Sep. 26, 2023

(54) CALIPER BODY AND BRAKE CALIPER WITH SAID BODY

(71) Applicant: BREMBO S.p.A., Curno (IT)

(72) Inventors: Francesco Gilardoni, Curno (IT); Andrea Bergami, Curno (IT); Carlo Cantoni, Curno (IT)

(73) Assignee: Brembo S.p.A, Bergamo (IT)

( * ) Notice: Subject to any disclaimer, the term of this patent is extended or adjusted under 35 U.S.C. 154(b) by 176 days.

(21) Appl. No.: 17/415,386

(22) PCT Filed: Dec. 13, 2019

(86) PCT No.: PCT/IB2019/060770
§ 371 (c)(1),
(2) Date: Jun. 17, 2021

(87) PCT Pub. No.: WO2020/128747
PCT Pub. Date: Jun. 25, 2020

(65) Prior Publication Data
US 2022/0042558 A1 Feb. 10, 2022

(30) Foreign Application Priority Data
Dec. 20, 2018 (IT) .................. 102018000020251

(51) Int. Cl.
F16D 65/00 (2006.01)
F16D 55/228 (2006.01)
(Continued)

(52) U.S. Cl.
CPC ....... F16D 55/228 (2013.01); F16D 65/0056 (2013.01); F16D 65/0068 (2013.01);
(Continued)

(58) Field of Classification Search
CPC ............... F16D 55/228; F16D 65/0056; F16D 65/0068; F16D 65/0075; F16D 65/0972;
(Continued)

(56) References Cited

U.S. PATENT DOCUMENTS 4,505,363 A 3/1985 Herbulot et al.
6,488,132 B2 12/2002 Matsuishi
(Continued)

FOREIGN PATENT DOCUMENTS

CN 201058604 Y 5/2008
CN 101947949 A 1/2011
(Continued)

OTHER PUBLICATIONS

European Patent Office, International Search Report with Written Opinion, issued in PCT/IB2019/060770 dated Jun. 24, 2020, 11 pages, European Patent Office, Rijswijk, Netherlands.

Primary Examiner — Christopher P Schwartz
(74) Attorney, Agent, or Firm — Marshall & Melhorn, LLC

(57) ABSTRACT

A caliper body has a first elongated vehicle-side element facing a first braking surface, a second elongated wheel-side element facing a second braking surface opposite to the first braking surface, each having at least one thrust seat receiving a thrust device biasing at least one brake pad against the braking surfaces, and at least one caliper bridge connecting the first elongated vehicle-side element to the second elongated wheel-side element. The caliper body has caliper fixing elements connecting the caliper body to a vehicle mount, the caliper fixing elements being at least three in number and distributed along the first elongated vehicle-side element. The first elongated vehicle-side element and second wheel-side element may have each at least two pad seats, each receiving at least one brake pad and at least two (Continued)

opposite abutment elements abuttingly receiving a brake pad for relieving the braking action on the caliper body.

10 Claims, 6 Drawing Sheets

(51) Int. Cl.
*F16D 65/097* (2006.01)
*F16D 65/18* (2006.01)
*F16D 55/00* (2006.01)
*F16D 121/04* (2012.01)

(52) U.S. Cl.
CPC ....... *F16D 65/0972* (2013.01); *F16D 65/183* (2013.01); *F16D 2055/0008* (2013.01); *F16D 2055/0016* (2013.01); *F16D 2121/04* (2013.01)

(58) Field of Classification Search
CPC ................ F16D 65/228; F16D 65/183; F16D 2055/0008; F16D 2055/0016; F16D 2121/04
USPC ......... 188/73.31, 73.39, 73.43, 73.46, 73.47, 188/369, 370
See application file for complete search history.

(56) References Cited

U.S. PATENT DOCUMENTS

| 7,926,625 | B2 | 4/2011 | Kawai et al. |
| 11,320,011 | B2 * | 5/2022 | Morio .................... F16D 55/228 |
| 2013/0092481 | A1 * | 4/2013 | Crippa ................ F16D 65/0068 |
| | | | 188/73.31 |
| 2021/0277969 | A1 * | 9/2021 | Rossi ..................... F16D 55/228 |

FOREIGN PATENT DOCUMENTS

| DE | 1480132 A1 | 5/1969 |
| DE | 19626901 C2 | 4/2000 |
| EP | 1760350 A1 | 3/2007 |
| GB | 2109068 B | 1/1985 |
| JP | 2009047186 A | 3/2009 |
| JP | 2010249171 A | 11/2010 |
| JP | 4752824 B2 | 8/2011 |
| WO | WO2014/091423 A2 | 6/2014 |

* cited by examiner (state of the art)

CALIPER BODY AND BRAKE CALIPER WITH SAID BODY

CROSS-REFERENCE TO RELATED APPLICATIONS

This application is a National Phase Application of PCT International Application No. PCT/IB2019/060770, having an International Filing Date of Dec. 13, 2019, which claims priority to Italian Application No. 102018000020251 filed Dec. 20, 2018, each of which is hereby incorporated by reference in its entirety.

FIELD OF THE INVENTION

The present invention relates to a caliper body of a disc brake, a brake caliper and a disc brake.

In particular, the present invention relates to a fixed caliper body, i.e. with opposite thrust devices which act on opposite brake pads acting on opposite braking surfaces of a disc brake disc.

Hereafter, the disc brake assembly will be described making reference to the rotation axis of the disc, indicated by reference X-X, which defines an axial direction. Axial direction means any direction A-A directed parallel to the rotation axis of the brake disc. Additionally, radial direction means all directions orthogonal to rotation axis X-X and incident therewith. Furthermore, circumferential direction means the circumference orthogonal to the axial direction and to the radial directions.

Conversely, tangential direction T-T means a direction which is punctually orthogonal to an axial direction A-A and a radial direction R-R.

BACKGROUND ART

On vehicles, and in particular on sports vehicles, it is particularly important to maximize the braking action and allow safe control of the vehicle by the driver to have a powerful braking action.

For this reason, large-diameter brake discs are often used, which are consequently capable of high braking action by virtue of their wide radius.

Again for this reason, where the maximum dimension of the brake disc is contained within the limited volume of the wheel rim, in which said disc is accommodated together with the brake caliper straddling it to apply the braking action, it is known to use two brake calipers on a single brake disc, or brake rotor, thereby increasing the friction surface and improving the performance of the disc-pad system both from a purely structural point of view and from the point of view of disc-pad system performance.

Such solutions are known from U.S. Pat. No. 2,007,989A1, CN201058604Y, CN101947949 and DE19626901.

However, this type of solution is not attractive to end-users and is difficult to implement, both for the complex management and synchronization of these brake calipers and for the complexity of construction and maintenance.

In order to solve this need, it has also been thought to make longer calipers, i.e. calipers capable of interacting with a greater arc of brake disc, i.e. calipers which cover a large arc of disc.

A solution of this type is known from JP2009047186A.

However, this known solution displays considerable problems of deformation of the caliper body, which lead to pad actions not always oriented as desired and therefore difficult to control, thus creating an accentuation of the problem, because these actions create further distortions in the caliper body and dissymmetries of braking force application and therefore of reactions on the vehicle.

As a result, it has become imperative in the sector, when calipers which cover a large arc of disc are made, to make very rigid, and therefore bulky and heavy, caliper bodies.

This undesired consequence greatly limits the application of these calipers only to special or heavy vehicles or to vehicles which suffer less from the large size of the calipers and its high weight, which as unsprung weight is still desirable to limit as much as possible.

Therefore, these known solutions do not allow solving all the strongly felt and conflicting needs to:

have a high braking action even with limited maximum brake disc diameters;
have a lightweight caliper body;
have a rigid caliper body with limited deformations or distortions generated by the braking action at the same time;
have greater ease of adjustment of the braking action;
have a greater braking action accuracy;
maintain braking performance also at high pressure/torque.

SUMMARY

These and other objects are achieved by a caliper body, a brake caliper, and a disc brake as described and claimed herein.

Some advantageous embodiments are the object of the dependent claims.

The analysis of this solution showed that the suggested solution also allows optimizing the deformation of the caliper in use. In particular, by virtue of the suggested solution, it is possible to have a great braking action also with limited maximum brake disc diameters and, at the same time, to have a lightweight caliper body and a rigid caliper body with limited deformations or distortions generated by the braking action, as well as greater ease in adjusting the braking action and greater braking action accuracy.

According to an embodiment, the four-pad configuration allows having a pad nominal working area equivalent to that of similar calipers but with a single pad for each side of the brake disc, with the advantage of increasing the useful area (i.e. the one which actually works during braking); this allows the single pad to work better, obtaining more uniform contact pressures, and thus to obtain better performance in terms of coefficient of friction. Furthermore, the passage from a single pad to two pads for each side of the brake disc allows reducing the number of thrust devices or pistons, resulting in a more compact and lighter caliper.

The solution with three fixing elements, or fasteners, one of which is slotted, allows optimizing the weight-rigidity ratio with respect to calipers with traditional fixings. In particular, the slotted fixing allows the caliper to "slip", following the deformation under torque, thus improving the coupling between pad and disc and the volumetric absorption of the caliper.

The caliper consists of two half-bodies placed side by side circumferentially, each with its own independent pad support surface. Furthermore, each pad has a dedicated piston.

By virtue of the suggested solutions, it is possible to obtain a lighter and more rigid caliper equipped with a three-point fastening system, which comprises two fasteners mechanically comparable to two joints, and a slotted fastener mechanically comparable to a shoe.

The operating conditions were verified, also by means of calculations, indicating a gain of about 20% in terms of volumetric absorption and of about 12% in terms of weight compared to a 6-piston caliper of equal thrust area and application.

FIGURES

Further features and advantages of the invention will be apparent from the description provided below of preferred embodiments thereof, given by way of non-limiting examples, with reference to the accompanying drawings, in which.

DESCRIPTION OF SOME PREFERRED EMBODIMENTS

Figure 1:
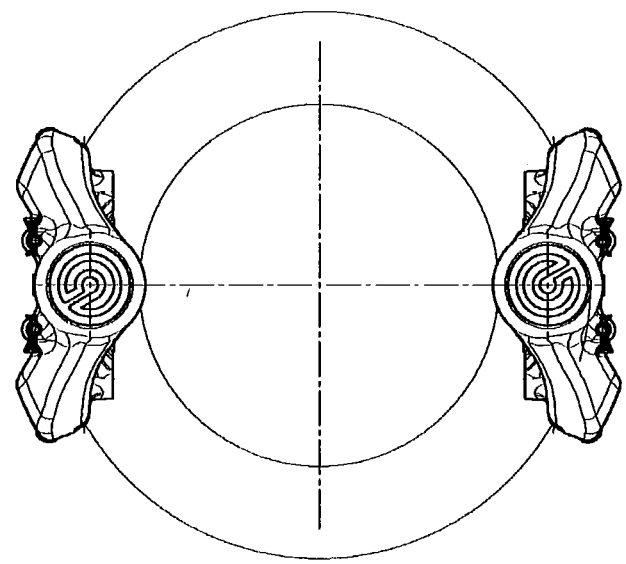
FIG. 1 shows a front view of a solution of the prior art, in which two brake calipers, with a separate system for feeding the brake fluid, are placed straddling two mutually separated arcs of disc on a brake disc of limited diameter.
Figure 2:
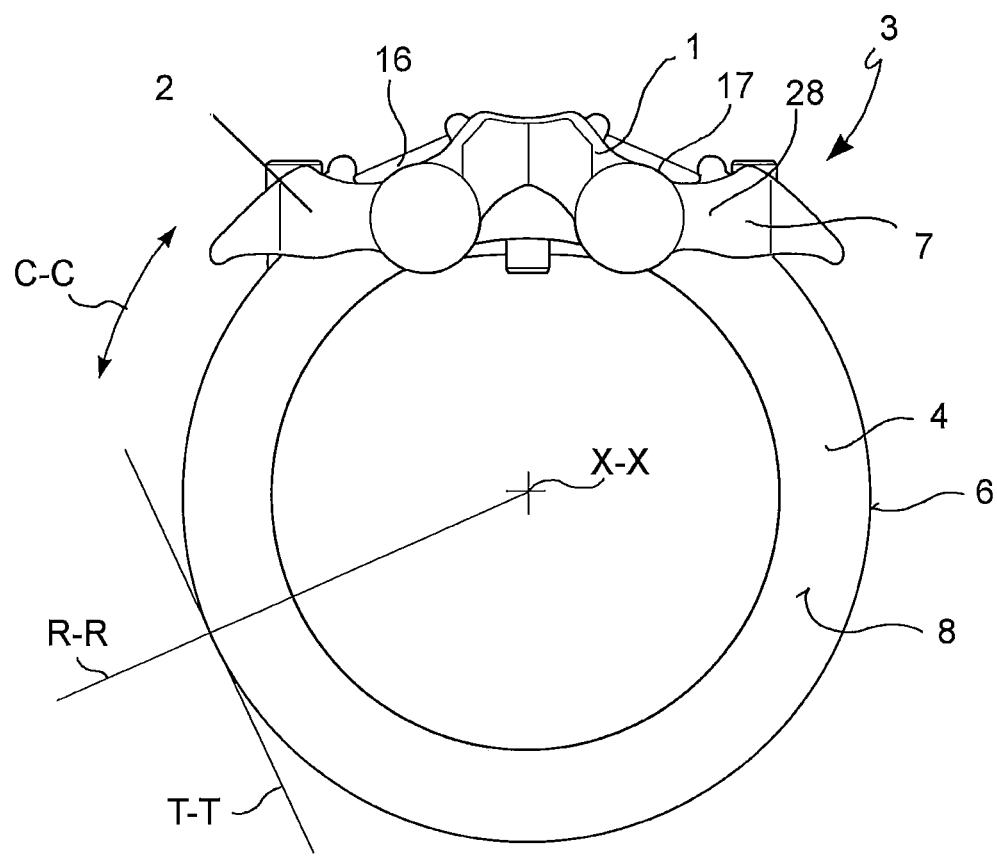
FIG. 2 shows a front view of a disc brake caliper according to the invention.
Figure 3:
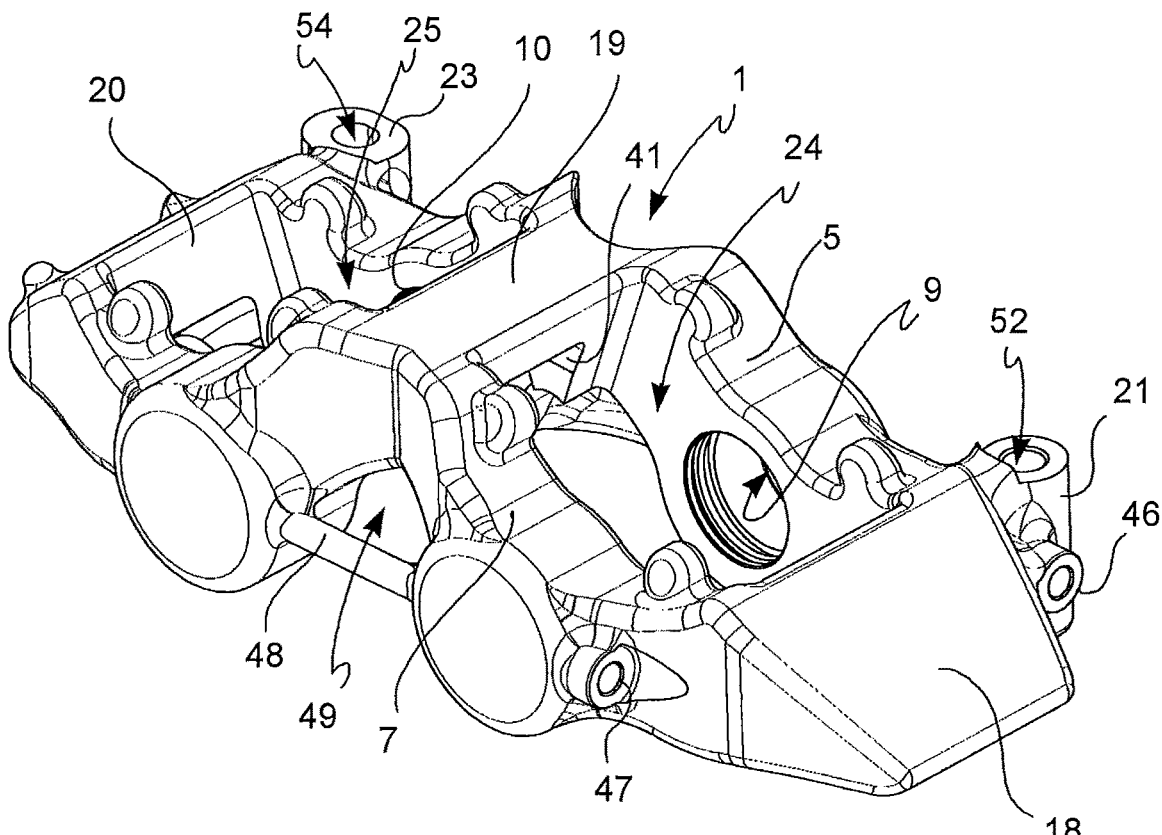
FIG. 3 shows an axonometric wheel-side view of a caliper body according to the invention.
Figure 4:
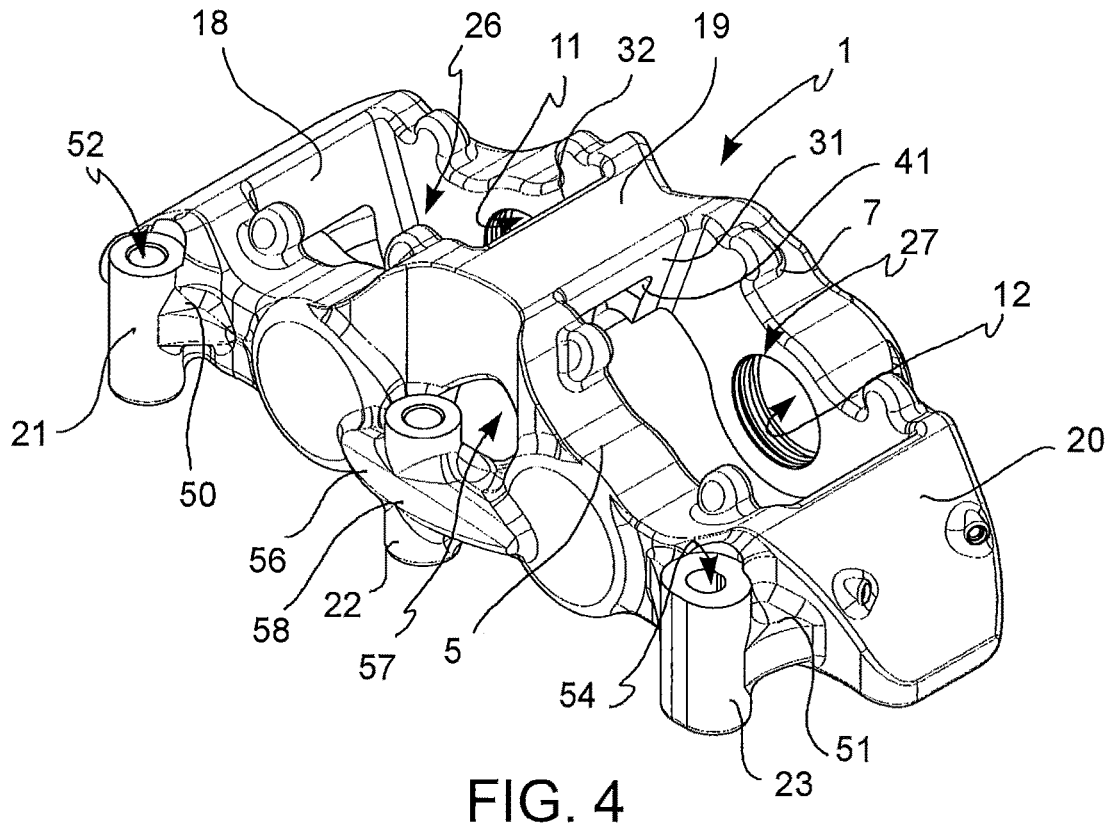
FIG. 4 shows an axonometric vehicle-side view of the caliper body in FIG. 3.
Figure 5:
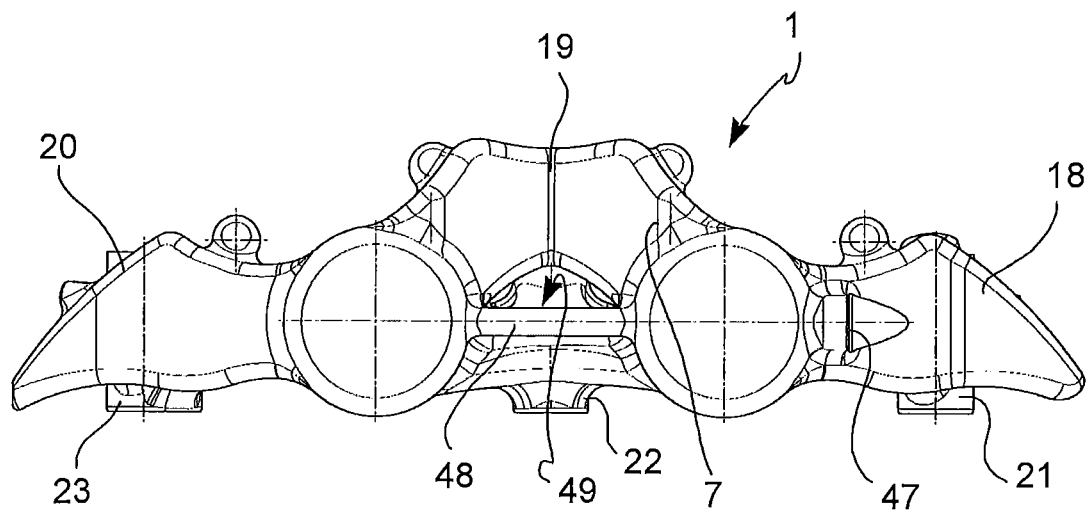
FIG. 5 shows an axonometric front or wheel-side view of the caliper body in FIG. 3.
Figure 6:
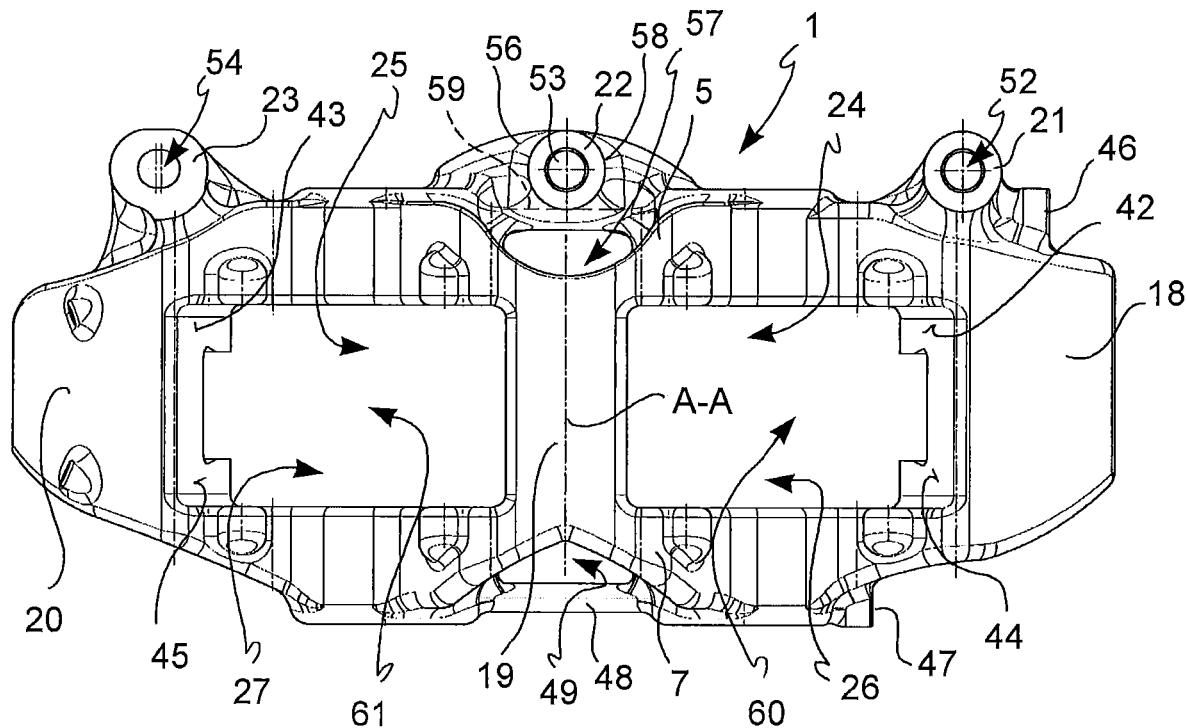
FIG. 6 is a top or radially outer view of the caliper body in FIG. 3.
Figure 7:
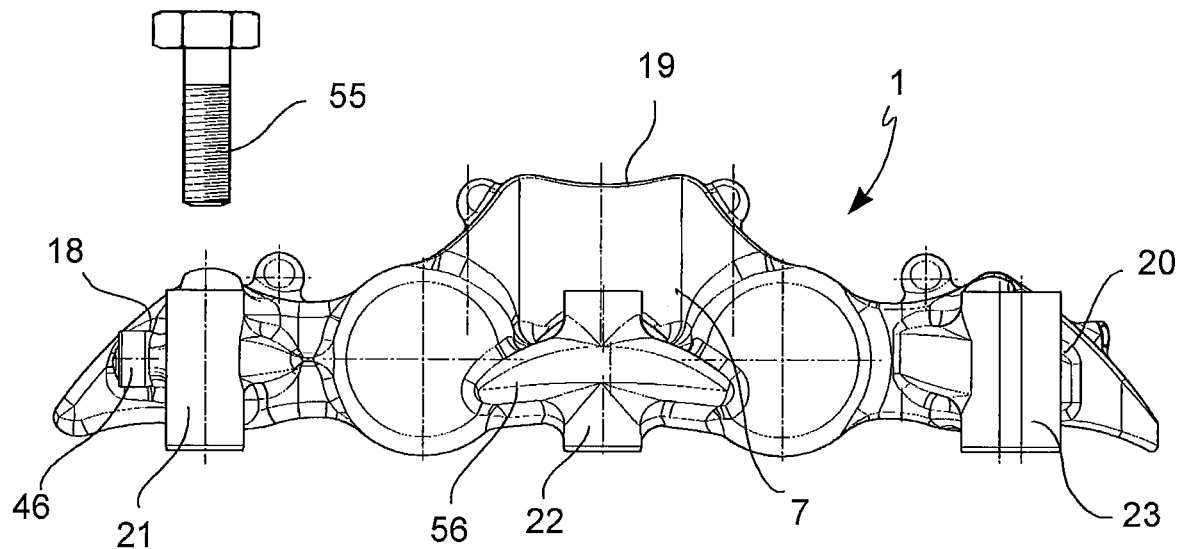
FIG. 7 shows a vehicle-side view or view from behind of the caliper in FIG. 3.
Figure 8:
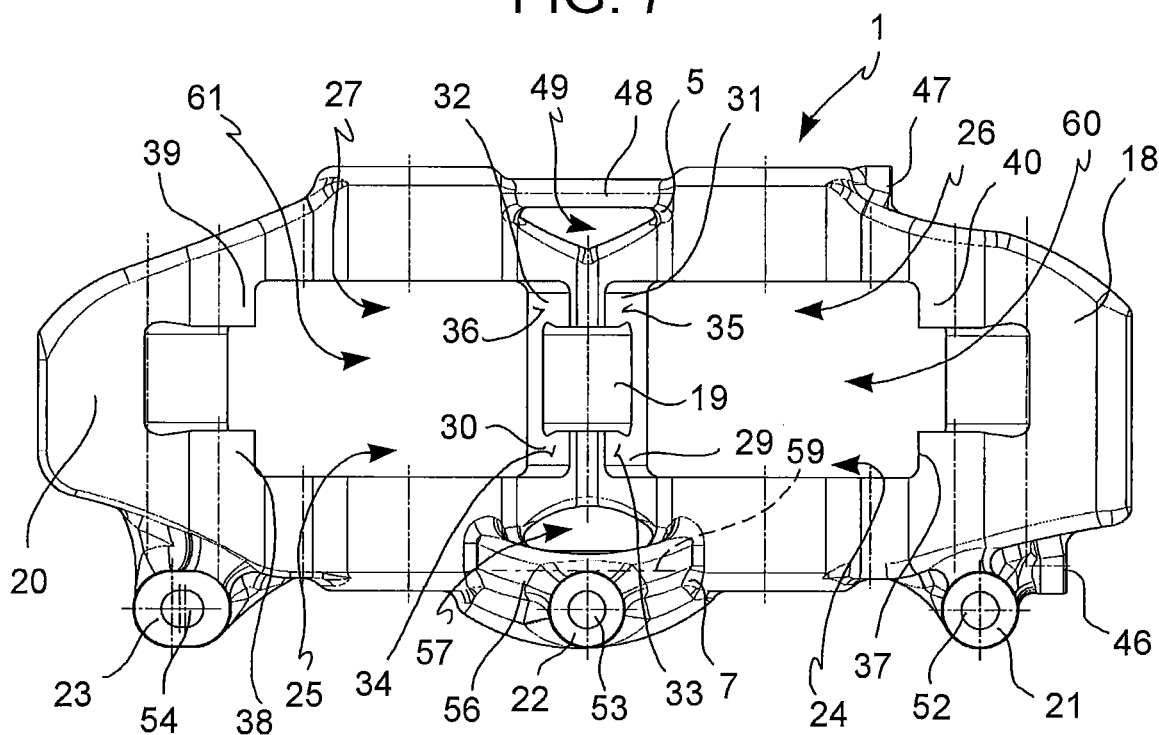
FIG. 8 shows a radially inner or bottom view of the caliper in FIG. 3.
Figure 9:
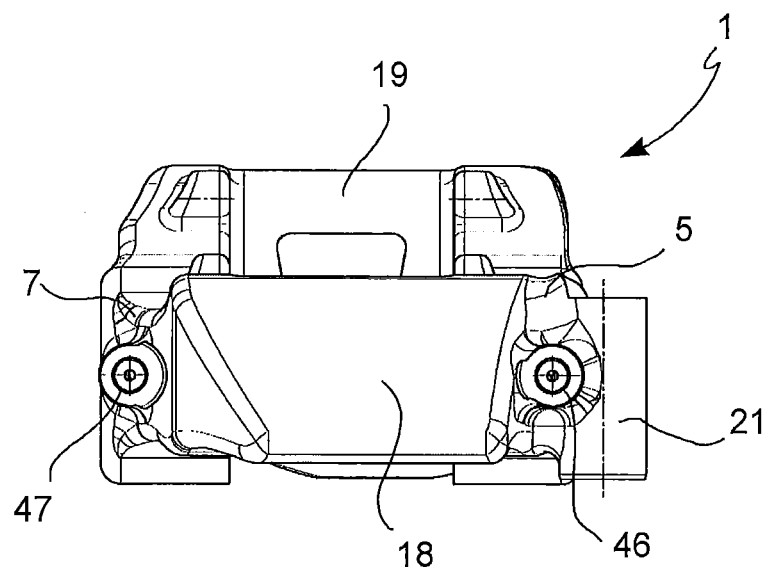
FIG. 9 shows a side view or view from the brake fluid inlet and/or vent side of the caliper body in FIG. 3.
Figure 10:
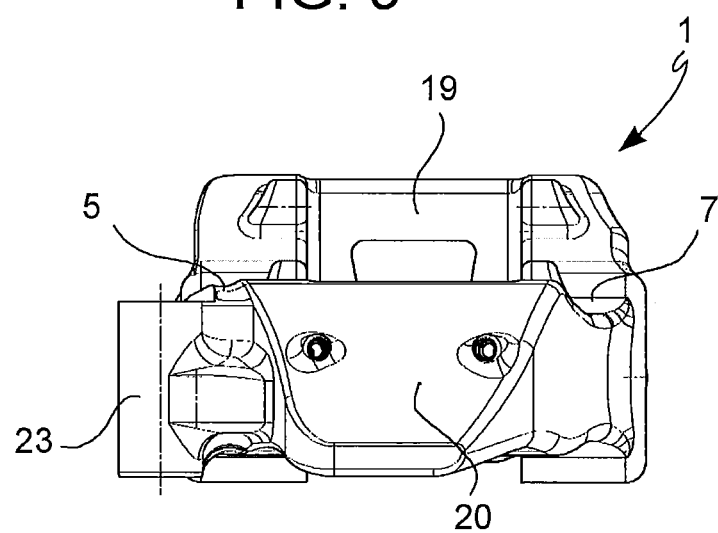
FIG. 10 shows a side view or view from the side opposite to the fluid inlet and/or vent side of the caliper body in FIG. 3.
Figure 11:
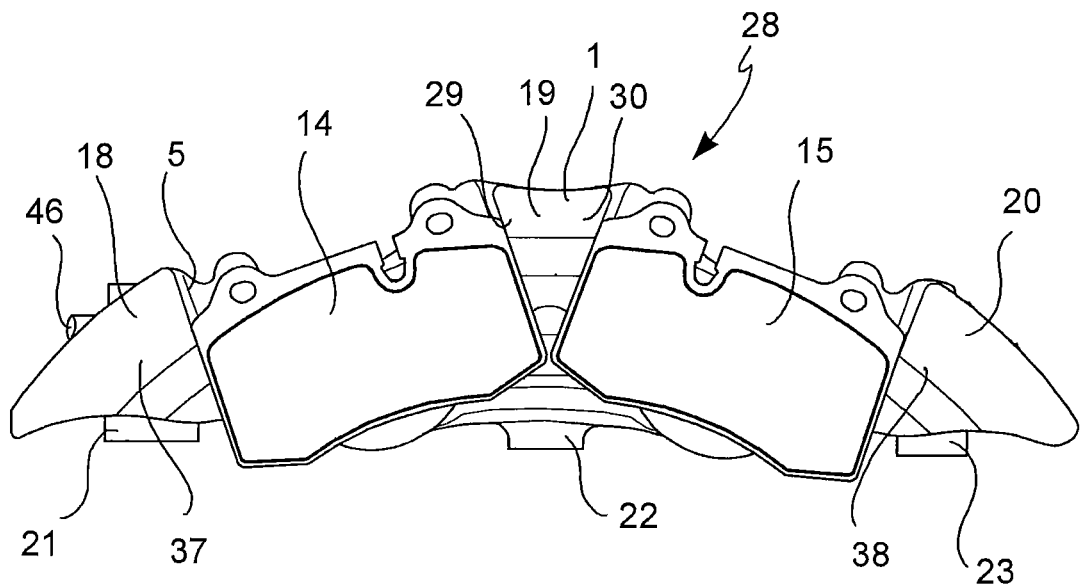
FIG. 11 shows a section view taken along a circumferential plane of a caliper according to the invention.
Figure 12:
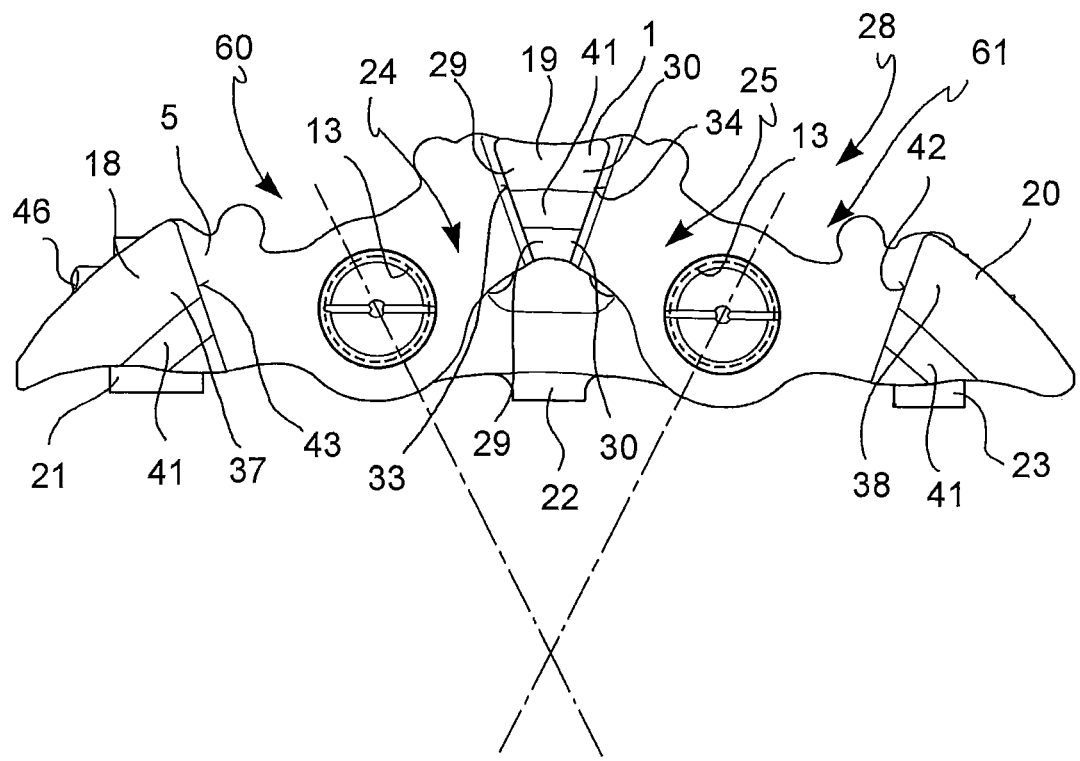
FIG. 12 shows a section view taken along a circumferential plane of the caliper body in FIG. 3.

According to a general embodiment, a caliper body 1 of a brake caliper 2 of disc brake 3 is adapted to be arranged straddling a brake disc 4 to apply a braking action on a vehicle.

This caliper body 1 comprises a first elongated vehicle-side element 5 adapted to face a first braking surface 6 of the brake disc 4.

This caliper body 1 comprises a second elongated wheel-side element 7 adapted to face a second braking surface 8 of the brake disc 4 opposite to said first braking surface 6.

Each of said elongated vehicle-side and wheel-side elements 5, 7 comprises at least one thrust seat 9, 10, 11, 12 to receive at least one thrust device 13 (dashed in the figure) adapted to bias at least one brake pad 14, 15, 16, 17 against said braking surfaces 6, 8 to apply a braking action to the vehicle.

This caliper body 1 comprises at least one caliper bridge 18, 19, 20 which connects said first elongated vehicle-side element 5 to said second elongated wheel-side element 7; said at least one caliper bridge 18, 19, 20 being arranged straddling said brake disc 4.

Advantageously, said first elongated vehicle-side element 5, said second elongated wheel-side element 7 and said at least one caliper bridge 18, 19, 20 are in one piece.

Said caliper body comprises caliper fixing elements 21, 22, 23 to connect said caliper body 1 to a vehicle mount, such as for example a steering knuckle.

Said caliper fixing elements 21, 22, 23 are at least three in number.

Said caliper fixing elements 21, 22, 23 are distributed along said elongated vehicle-side element 5.

Advantageously, said elongated vehicle-side and caliper-side elements 5, 7 each comprise at least two pad seats 24, 25, 26, 27, each adapted to receive at least one brake pad 14, 15, 16, 17.

Said elongated vehicle-side and wheel-side elements 5, 7 each comprise at least two opposite abutment elements 29, 30, 31, 32 each adapted to abuttingly receive a brake pad 14, 15, 16, 17 for relieving the braking action onto said caliper body 1.

Each of said at least two opposite abutment elements 29, 30, 31, 32 is placed between two of said brake pads 14, 15, 16, 17.

According to an embodiment, said at least two opposite abutment elements 29, 30 or 31, 32 of each of said elongated vehicle-side and caliper-side elements 5, 7 comprise opposite abutment surfaces 33, 34 or 35, 36 adapted to abuttingly receive two adjacent brake pads 14, 15 or 16, 17 spaced apart by said abutment elements 29, 30 or 31, 32.

According to an embodiment, said opposite abutment surfaces 33, 34 or 35, 36 of each of said elongated vehicle-side and caliper-side elements 5, 7 are mutually converging when traveled in radial direction R-R directed towards the rotation axis of the brake disc X-X.

According to an embodiment, said at least two opposite abutment elements 29, 30 or 31, 32 are in one body or piece with a caliper bridge 19, or central caliper bridge, which connects said first elongated vehicle-side element 5 to said second elongated wheel-side element 7, said central caliper bridge 19 being arranged straddling said brake disc 4 in a substantially central position with respect to the caliper body 1 when traveled along a circumferential direction C-C.

According to an embodiment, each pad seat 24 or 25 or 26 or 27 is delimited by at least one end abutment element 37 or 38 or 39 or 40 which circumferentially delimits C-C said pad seat 24 or 25 or 26 or 27 in the end thereof facing the outside of the caliper when evaluated in circumferential direction C-C.

According to an embodiment, said at least one end abutment element 37 or 38 or 39 or 40 for each pad seat 24 or 25 or 26 or 27 is in one body or piece with an end caliper bridge 18 or 20 or end caliper bridge, which connects said first elongated vehicle-side element 5 to said second elongated wheel-side element 7, said end caliper bridge 18 or 20 being arranged straddling said brake disc 4 substantially in an end position of the caliper body 1 when traveled along a circumferential direction C-C.

According to an embodiment, said abutment elements 29, 30 or 31, 32 and/or 37 or 38 or 39 or 40 each comprise a step or recess or an evacuation groove 41.

According to an embodiment, said evacuation groove 41 is directed circumferentially C-C.

According to an embodiment, an evacuation groove 41 allows the evacuation of dust accumulated between the pad and said abutment elements 29, 30 or 31, 32 and/or 37 or 38 or 39 or 40 and/or of heat accumulated during the braking action.

According to an embodiment, said end abutment elements 37, 38, 39, 40 of each of said elongated vehicle-side and caliper-side elements 5, 7 comprise end abutment surfaces 42, 43, 44, 45 adapted to abuttingly receive a brake pad 14 or 15 or 16 or 17.

According to an embodiment, each pad seat 24, 25, 26, 27 is delimited at the circumferential ends thereof by two abutment surfaces 33, 42; 34, 43; 35, 44; 36, 45.

According to an embodiment, said two abutment surfaces 33, 42; 34, 43; 35, 44; 36, 45 of each pad seat 24, 25, 26, 27 are mutually parallel.

According to an embodiment, each of said elongated vehicle-side and wheel-side elements 5, 7 comprises two thrust seats 9, 10 and 11, 12 to each receive a thrust device 13 adapted to each bias a brake pad 14, 15, 16, 17 against said braking surfaces 6, 8 to apply a braking action to the vehicle.

According to an embodiment, said elongated vehicle-side and wheel-side elements 5, 7 are shaped according to the shape of said thrust seats 9, 10 and 11, 12 limiting the thickness of the material.

According to an embodiment, the thickness of the material of the elongated vehicle-side and wheel-side elements 5, 7 is substantially constant about the thrust seats 9, 10 and 11, 12.

According to an embodiment, said elongated vehicle-side element 5, near the end thereof which will be mounted in a vehicle in a position which is more raised or further from a supporting surface of the vehicle, comprises a brake fluid inlet and/or vent 46.

According to an embodiment, said elongated wheel-side element 7, near the end thereof which will be mounted in a vehicle in a position which is more raised or further from a supporting surface of the vehicle, comprises a brake fluid inlet and/or vent 47.

According to an embodiment, a fluid feeding pipe 48 connecting the two seats is comprised between two thrust seats 11, 12 on the wheel side of the caliper body 1.

According to an embodiment, the fluid feeding pipe 48 connecting the two seats is separated from said elongated wheel-side element 7 thus forming a wheel-side window 49.

According to an embodiment, said brake fluid inlet and/or vent 47 is aligned with said fluid feeding pipe 48 connecting the two seats.

According to an embodiment, said caliper fixing elements 21, 22, 23 connecting said caliper body 1 to a vehicle mount are two end fixing elements 21, 23 and a central fixing element 22.

According to an embodiment, at least one of said end fixing elements 21, 23 is placed at the end of a respective end fixing element bracket 50, 51 which connects it to the elongated vehicle-side body 5, placing it cantilevered with respect to the latter.

According to an embodiment, said caliper fixing elements 21, 22, 23 comprise fixing device connection seats and/or slots 52, 53, 54.

According to an embodiment, said fixing device connection seats and/or slots 52, 53, 54 are through holes.

According to an embodiment, said fixing device connection seats and/or slots 52, 53, 54 extend along mutually parallel directions.

According to an embodiment, said fixing device connection seats and/or slots 52, 53, 54 extend along directions which are substantially orthogonal to the rotation axis of the brake disc X-X when the caliper is mounted to the steering knuckle and placed straddling the disc brake 4.

According to an embodiment, at least one of said end fixing elements 21, 23 comprises a fixing device connection slot 54 which allows a relative movement between caliper body 1 and steering knuckle of the vehicle when the caliper body is mounted to the steering knuckle.

According to an embodiment, an end caliper fixing element 23 opposite to a brake fluid inlet and/or vent 46 comprises a fixing device connection slot 54 which allows a relative movement between caliper body 1 and steering knuckle of the vehicle when the caliper body is mounted to the steering knuckle.

According to an embodiment, said fixing device connection slot 54 allows a relative movement between said seat and a fixing device 55.

According to an embodiment, said slot 54 allows a movement in tangential direction T-T.

According to an embodiment, said caliper fixing elements 21, 22, 23 are aligned circumferentially C-C.

According to an embodiment, fixing devices are in fixing portions detached from the caliper body and connected to it by bridge ribs.

According to an embodiment, the central fixing device comprises ribs through which a brake fluid feeding line passes.

According to an embodiment, two end fixing and one central fixing devices are provided. The central fixing device forms a window with the caliper body passing through it in the axial direction.

According to an embodiment, the fixing devices comprise bases or lower surfaces. Said bases are aligned on a single plane.

According to an embodiment, at least one seat is slotted to allow the sliding of connecting element stud connection to the steering knuckle.

According to an embodiment, said caliper body 1 comprises a side bridge 56 which circumferentially connects two portions of said elongated vehicle-side element 5, thus forming a vehicle-side window 57 between said side bridge 56 and said elongated vehicle-side element 5.

According to an embodiment, said side bridge 56 connects to the portions of elongated vehicle-side element 5 which delimit said thrust seats 9, 10.

According to an embodiment, said side bridge 56 connects to said elongated vehicle-side element 5 in end portions of the portions which delimit said thrust seats 9, 10.

According to an embodiment, said central caliper fixing element 22 is placed on said side bridge 56.

According to an embodiment, said central caliper fixing element 22 is placed at an end of the central bridge 56 which cantilevers away from the caliper body 1.

According to an embodiment, said central bridge 56 comprises a side bridge portion 58 which forms a second fluid feeding pipe 59 which connects the two vehicle-side thrust seats 9, 10.

According to an embodiment, said elongated vehicle-side element 5 comprises a brake fluid inlet and/or vent 46 placed aligned with said second fluid feeding pipe 59.

According to an embodiment, said pad seats 24, 25, 26, 27 are shaped as pockets so as to accommodate brake pads 14, 15, 16, 17, wherein those pockets which are obtained on the elongated element 5; 7 are mutually inclined so that the extensions thereof converge passing in radial direction from outside to inside the caliper along a median seat or pad line.

According to an embodiment, said caliper body 1 with the vehicle-side and elongated wheel-side elements 5, 7 thereof and the end and central bridges 18, 19, 20 thereof form two pad extraction windows 60, 61.

According to an embodiment, said caliper body 1 comprises two side windows 49, 57.

According to an embodiment, said two side windows 49, 57 are aligned with the central bridge in a substantially axial direction A-A.

The present invention further relates to a brake caliper 28 of disc brake comprising a caliper body as defined in any one of the embodiments described above.

The present invention also relates to a disc brake comprising a brake caliper as defined above and a brake disc 4.

The person skilled in the art may make many changes and adaptations to the embodiments described above or may replace elements with others which are functionally equivalent in order to satisfy contingent needs without however departing from the scope of the appended claims.

LIST OF REFERENCES 1 caliper body
2 brake caliper
3 disc brake
4 brake disc
5 vehicle-side elongated portion
6 first braking surface
7 wheel-side elongated element
8 second braking surface
9 vehicle-side thrust seat
10 vehicle-side thrust seat
11 wheel-side thrust seat
12 wheel-side thrust seat
13 thrust device
14 brake pad
15 brake pad
16 brake pad
17 brake pad
18 caliper end bridge, vent and/or fluid inlet side
19 central caliper bridge
20 caliper end bridge, opposite vent and/or fluid inlet side
21 fluid inlet and/or vent end caliper fixing element
22 central caliper fixing element
23 end caliper fixing element opposite to inlet and/or vent
24 pad seat
25 pad seat
26 pad seat
27 pad seat
28 disc brake caliper
29 opposite abutment element
30 opposite abutment element
31 opposite abutment element
32 opposite abutment element
33 opposite vehicle-side abutment surface, fluid inlet side
34 opposite vehicle-side abutment surface, side opposite to fluid inlet
35 opposite wheel-side abutment surface, vent side
36 opposite wheel-side abutment surface, side opposite to vent
37 end abutment element
38 end abutment element
39 end abutment element
40 end abutment element
41 evacuation groove
42 vehicle-side end abutment surfaces, fluid inlet side
43 vehicle-side end abutment surfaces, side opposite to fluid inlet
44 wheel-side end abutment surfaces, vent side
45 wheel-side abutment surfaces, side opposite to vent
46 vehicle-side inlet and/or vent
47 wheel-side braking fluid inlet and/or vent
48 fluid feeding pipe connecting the two seats
49 wheel-side side window
50 end fixing element bracket, inlet and/or vent side
51 end fixing element bracket, opposite inlet and/or vent side
52 fastening device connection seat, inlet and/or vent side
53 central fastening device connection seats
54 fixing device connection slot, opposite inlet and/or vent side
55 fastening device
56 side bridge
57 vehicle-side side window
58 side bridge portion
59 second fluid feeding pipe
60 pad extraction window, vent and/or fluid inlet side
61 pad extraction window, opposite vent and/or fluid inlet side
X-X brake disc rotation axis
A-A axial direction parallel to rotation axis
R-R radial direction orthogonal to rotation axis
C-C circumferential direction orthogonal to the axial and radial directions
T-T tangential direction punctually orthogonal to a radial direction and axial direction

The invention claimed is:

1. A caliper body of a brake caliper of disc brake configured to be arranged straddling a brake disc to apply a braking action to a vehicle, the caliper body comprising:
a first elongated vehicle-side element configured to face a first braking surface of the brake disc;
a second elongated wheel-side element configured to face a second braking surface of the brake disc opposite to said first braking surface;
each of said first elongated vehicle-side element and second elongated wheel-side element comprising at least one thrust seat to receive at least one thrust device configured to bias at least one brake pad against said first and second braking surfaces to apply a braking action to the vehicle;
at least one caliper bridge which connects said first elongated vehicle-side element to said second elongated wheel-side element; said at least one caliper bridge being arranged straddling said brake disc;
wherein said first elongated vehicle-side element, said second elongated wheel-side element and said at least one caliper bridge are in one piece;
and wherein said caliper body comprises caliper fixing elements to connect said caliper body to a vehicle mount;
and wherein said caliper fixing elements are at least three in number;
said caliper fixing elements are distributed along said first elongated vehicle-side element;
wherein said first elongated vehicle-side element and second elongated wheel-side element each comprise at least two pad seats, each pad seat configured to receive at least one brake pad; wherein
said first elongated vehicle-side and second elongated wheel-side elements each comprise at least two opposite abutment elements, each abutment element being configured to abuttingly receive a brake pad for relieving the braking action on said caliper body;
and wherein
each of said at least two opposite abutment elements is placed between two brake pads.

2. The caliper body of claim 1, wherein:

said at least two opposite abutment elements of each of said first elongated vehicle-side element and second elongated wheel-side element comprise opposite abutment surfaces configured to abuttingly receive two adjacent brake pads spaced apart by said at least two opposite abutment elements;

and wherein said opposite abutment surfaces of each of said first elongated vehicle-side element and second elongated wheel-side element are mutually converging when travelled in radial direction (R-R) towards a rotation axis of the brake disc (X-X);

and wherein said at least two opposite abutment elements are in one body or piece with a central caliper bridge, which connects said first elongated vehicle-side element to said second elongated wheel-side element, said central caliper bridge being arranged straddling said brake disc in a central position with respect to the caliper body when travelled along a circumferential direction (C-C);

and wherein each pad seat is delimited by at least one end abutment element which circumferentially delimits said pad seat in an end thereof facing outside of the caliper body when evaluated in circumferential direction (C-C);

and wherein said at least one end abutment element is in one body or piece with an end caliper bridge, which connects said first elongated vehicle-side element to said second elongated wheel-side element, said end caliper bridge being arranged straddling said brake disc in an end position of the caliper body when travelled along the circumferential direction (C-C);

and wherein said two opposite abutment elements and end abutment elements each comprise an evacuation groove; wherein said evacuation groove is directed circumferentially; and wherein the evacuation groove allows evacuation of dust accumulated between the brake pads and said two opposite abutment elements and end abutment elements and/or of heat accumulated during the braking action;

and wherein said end abutment elements of each of said first elongated vehicle-side element and second elongated wheel-side elements comprise end abutment surfaces adapted to abuttingly receive a brake pad;

and wherein each pad seat is delimited at a circumferential end thereof by two abutment surfaces;

and wherein said two abutment surfaces of each pad seat are mutually parallel.

3. The caliper body of claim 1, wherein:

each of said first elongated vehicle-side element and second wheel-side element comprises two thrust seats to each receive a thrust device configured to each bias a brake pad against said braking surfaces to apply the braking action to the vehicle;

and wherein said first elongated vehicle-side element and second wheel-side elongated element are shaped according to a shape of said thrust seats; and wherein the thickness of material of the first elongated vehicle-side element and second elongated wheel-side element is constant about the thrust seats;

and wherein said first elongated vehicle-side element, near an end thereof comprises a brake fluid inlet and/or vent;

and wherein said second elongated wheel-side element, near an end thereof comprises a brake fluid inlet and/or vent;

and wherein a fluid feeding pipe connecting two thrust seats is between two thrust seats on a wheel side of the caliper body;

and wherein the fluid feeding pipe connecting the two thrust seats on the wheel side is spaced from said second elongated wheel-side element forming a wheel-side window;

and wherein said brake fluid inlet and/or vent is aligned with said fluid feeding pipe connecting the two thrust seats.

4. The caliper body of claim 1, wherein:

said caliper fixing elements connecting said caliper body to the vehicle mount are two end caliper fixing elements and a central caliper fixing element;

and wherein at least one of said two end fixing elements is placed at an end of a respective end fixing element bracket which connects it to the first elongated vehicle side element, placing it cantilevered with respect to the first elongated vehicle-side.

5. The caliper body of claim 4, wherein:

said caliper fixing elements comprise fixing device connection seats; wherein said fixing device connection seats are through holes; and wherein said fixing device connection seats extend along mutually parallel directions;

or wherein said fixing device connection seats extend along directions orthogonal to the rotation axis of the brake disc (X-X) when the caliper body is mounted to a steering knuckle and placed straddling the disc brake; wherein at least one of said end fixing elements allows a relative movement between the caliper body and the steering knuckle of the vehicle when the caliper body is mounted to the steering knuckle; or wherein an end caliper fixing element opposite to the brake fluid inlet allows a relative movement between the caliper body and the steering knuckle of the vehicle when the caliper body is mounted to the steering knuckle; and wherein a fixing device connection slot allows a relative movement between said connection seat and a fixing device, wherein said fixing device connection slot allows a movement in tangential direction (T-T);

and wherein said caliper fixing elements are circumferentially aligned (C-C).

6. The caliper body of claim 1, wherein:

said caliper body comprises a side bridge which circumferentially connects two portions of said first elongated vehicle-side element, forming a vehicle-side window between said side bridge and said first elongated vehicle-side element;

and wherein said side bridge connects to portions of the first elongated vehicle-side element delimiting said thrust seats;

and wherein said central caliper fixing element is placed on said side bridge; or wherein said central caliper fixing element is placed at an end of the central bridge which cantilevers away from the caliper body;

and wherein
said central bridge comprises a side bridge portion which forms a second fluid feeding pipe which connects the two vehicle-side thrust seats;
and wherein
said first elongated vehicle-side element comprises a brake fluid inlet and/or vent placed aligned with said second fluid feeding pipe.

7. The caliper body of claim 1, wherein said pad seats are shaped as pockets to accommodate the brake pads, wherein the pockets which are obtained on the first elongated vehicle-side element and second elongated wheel-side element are mutually inclined so that extensions thereof converge passing in radial direction from outside to inside the caliper body.

8. The caliper body of claim 1, wherein:
said caliper body with the first elongated vehicle-side element and second elongated wheel-side element and the end and central caliper bridges form two pad extraction windows;
and wherein
said caliper body comprises two side windows;
and wherein
said two side windows are aligned with the central caliper bridge in axial direction (A-A).

9. A brake caliper of disc brake comprising a caliper body according to claim 1.

10. A brake disc comprising a brake caliper as defined in claim 9 and a brake disc.

* * * * *